United States Patent
Long et al.

(10) Patent No.: US 12,187,641 B1
(45) Date of Patent: Jan. 7, 2025

(54) FIBERGLASS RECOVERY METHOD

(71) Applicant: Carbon Rivers G2G, Inc., Knoxville, TN (US)

(72) Inventors: Jedidiah Long, Clinton, TN (US); Austin Staub, Knoxville, TN (US); Nicholas Ciparro, Knoxville, TN (US)

(73) Assignee: Carbon Rivers G2G, Inc., Knoxville, TN (US)

( * ) Notice: Subject to any disclaimer, the term of this patent is extended or adjusted under 35 U.S.C. 154(b) by 0 days.

(21) Appl. No.: 18/423,878

(22) Filed: Jan. 26, 2024

(51) Int. Cl.
| | |
|---|---|
| *C03C 25/002* | (2018.01) |
| *C03C 25/601* | (2018.01) |
| *C03C 25/70* | (2006.01) |
| *B29B 17/04* | (2006.01) |

(52) U.S. Cl.
CPC .......... *C03C 25/002* (2013.01); *C03C 25/601* (2013.01); *C03C 25/70* (2013.01); *B29B 2017/0496* (2013.01)

(58) Field of Classification Search
CPC ............ C03C 25/601–606; C03C 21/001–006
See application file for complete search history.

(56) References Cited

U.S. PATENT DOCUMENTS

| | | | | |
|---|---|---|---|---|
| RE27,921 E | * | 2/1974 | Duthoit ................. | C03C 21/002 65/114 |
| 8,312,739 B2 | * | 11/2012 | Lee ........................ | C03C 3/093 65/30.13 |
| 2011/0293942 A1 | * | 12/2011 | Cornejo .................. | C03C 3/083 65/355 |
| 2013/0219965 A1 | * | 8/2013 | Allan ..................... | C03C 21/002 65/30.14 |
| 2015/0184079 A1 | | 7/2015 | Riedewald | |
| 2018/0148373 A1 | * | 5/2018 | Harris ...................... | B08B 9/42 |
| 2020/0140315 A1 | | 5/2020 | Ginder | |
| 2021/0237317 A1 | | 8/2021 | Dubois | |

FOREIGN PATENT DOCUMENTS

WO 2022207757 A2 10/2022

OTHER PUBLICATIONS

International Search Report and Written Opinion for PCT/US24/13112, date of mailing Jun. 18, 2024, 13 pages.

* cited by examiner

*Primary Examiner* — Erin Snelting
(74) *Attorney, Agent, or Firm* — Chambliss, Bahner & Stophel, P.C.; Stephen D. Adams

(57) ABSTRACT

An apparatus, system, and method for recycling glass fiber waste, particularly glass fiber embedded within a binder material. The system includes a kiln, a char separator, and a multi-stage molten salt bath having a temperature gradient. Glass fiber waste is provided to the kiln which converts the waste into glass fibers and char. At least some of the char is then separated from the glass fibers in the char separator. The glass fibers, and any remaining char, are then placed in the molten salt bath at the point having the lowest temperature. The glass fibers are then moved to the higher temperature areas within the molten salt bath. As the glass fibers pass from the low temperature to the high temperature, any remaining char is consumed, and the glass fibers are reconditioned via ionic exchange for further use. The glass fibers are then cooled for reuse.

20 Claims, 7 Drawing Sheets

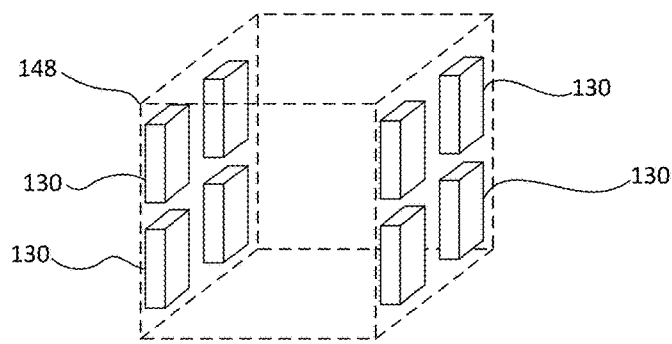
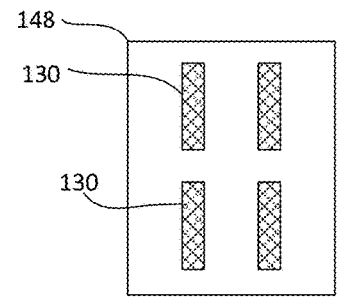
FIGURE 6A
FIGURE 6B
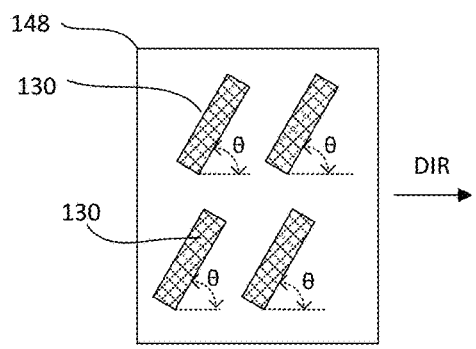
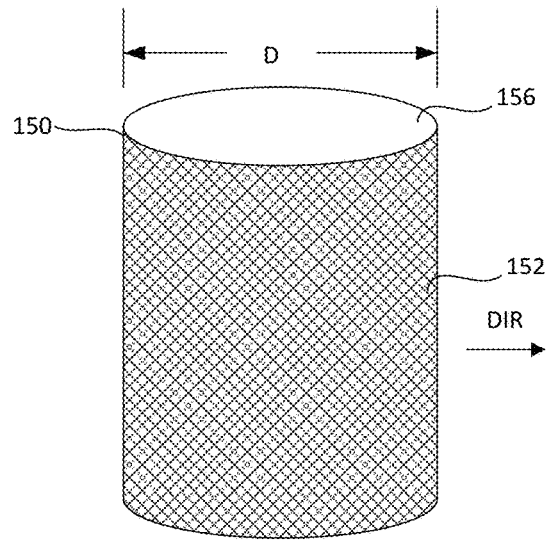
FIGURE 6C
FIGURE 7

FIBERGLASS RECOVERY METHOD

CROSS-REFERENCE TO RELATED APPLICATIONS

This application claims the benefit of U.S. Provisional Application No. 63/481,894 filed Jan. 27, 2023, and entitled FIBERGLASS RECOVERY METHOD, which is incorporated herein by reference in its entirety.

FIELD

The present disclosure relates generally to recycling or reconditioning glass fibers. More specifically, the present disclosure relates to a method of recycling glass fiber waste utilizing a molten salt bath and a system for recycling said glass fiber waste incorporating, among other things, a molten salt bath.

BACKGROUND

Glass fibers are commonly embedded in a variety of materials to increase the strength of those materials or to provide other desirable properties. For example, when glass fibers are placed in a plastic matrix, the resulting product is fiberglass (also commonly called glass-reinforced plastic (GRP) or fiberglass-reinforced plastic (FRP)), which is stronger and lighter than either component alone. Fiberglass is used in a variety of products across different industries, including in boat hulls, automobile parts, construction materials, swimming pools, surf boards, fishing rods, septic tanks, etc. Once glass fibers are placed in a plastic matrix, their recovery has historically been impractical. Not only is liberating the glass fibers from the matrix difficult and labor intensive, but the methods for liberation have either reduced the glass fibers to an unusable size or degraded the mechanical properties of the fibers to a level where the fibers are no longer usable for most applications.

These problems, especially the problem of degraded tensile strength, particularly impacts the wind turbine blade industry, because many turbine blades are constructed from fiberglass and have a length of over 170 feet. After a turbine blade exceeds its useful lifespan, it is replaced with a new blade or the wind turbine is replaced all together. Since there is currently no practical recycling solution, old fiberglass blades are often sent to a landfill or a waste-storage facility, which strains waste management resources and increases the negative environmental impact of the wind turbine. Similar problems arise for other fiberglass products.

What is needed, therefore, is a method and system for recycling glass fiber waste resulting in glass fibers with a tensile strength and usability roughly equivalent to unused, i.e., virgin, glass fibers.

Notes on Construction

The use of the terms "a", "an", "the" and similar terms in the context of describing embodiments of the invention are to be construed to cover both the singular and the plural, unless otherwise indicated herein or clearly contradicted by context. The terms "comprising", "having", "including" and "containing" are to be construed as open-ended terms (i.e., meaning "including, but not limited to,") unless otherwise noted. The terms "substantially", "generally" and other words of degree are relative modifiers intended to indicate permissible variation from the characteristic so modified. The use of such terms in describing a physical or functional characteristic of the invention is not intended to limit such characteristic to the absolute value which the term modifies, but rather to provide an approximation of the value of such physical or functional characteristic.

Terms concerning attachments, coupling and the like, such as "attached", "connected" and "interconnected", refer to a relationship wherein structures are secured or attached to one another either directly or indirectly through intervening structures, as well as both moveable and rigid attachments or relationships, unless otherwise specified herein or clearly indicated as having a different relationship by context. The term "operatively connected" is such an attachment, coupling or connection that allows the pertinent structures to operate as intended by virtue of that relationship.

The use of any and all examples or exemplary language (e.g., "such as" and "preferably") herein is intended merely to better illuminate the invention and the preferred embodiments thereof, and not to place a limitation on the scope of the invention. Nothing in the specification should be construed as indicating any element as essential to the practice of the invention unless so stated with specificity.

Numerical ranges recited herein by endpoints include all numbers and fractions subsumed within that range (e.g., 1 to 3 includes 1, 1.25, 1.8, 2, 2.5, 2.78, and 3). Similarly, numerical ranges recited by endpoints include subranges contained within said range (e.g., 1 to 3 includes 1-2.75, 1.3-2.6, 2-3, and 2.3-2.4).

SUMMARY

The following presents a simplified summary of one or more embodiments of the invention to provide a basic understanding of such embodiments. This summary is not an extensive overview of all contemplated embodiments and is intended to neither identify key or critical elements of all embodiments, nor delineate the scope of any or all embodiments. Its sole purpose is to present some concepts of one or more embodiments in a simplified form as a prelude to the more detailed description that is presented later.

The above and other problems may be addressed in certain instances by an apparatus for removing char from glass fibers and for increasing a tensile strength of the glass fibers. The apparatus may include a molten salt bath provided with molten salt and forming a temperature gradient for gradually and continuously heating the glass fibers. The molten salt bath may have a first stage configured to heat glass fibers to within a first temperature range and a second stage configured to heat glass fibers to within a second and higher temperature range such that a temperature gradient is formed in the molten salt bath. The molten salt bath may also include a movable separator provided between the first stage and the second stage. The movable separator is configured to provide thermal separation between the first stage and the second stage of the molten salt bath. The separator is also moveable to allow the glass fibers to pass from the first stage into the second stage while still being located within the molten salt bath and remaining continuously heated to at least within the first temperature range. The molten salt bath also has transport means for transporting the glass fibers through the molten salt bath, including from the first stage, past the movable separator, and to the second stage.

In certain embodiments the first temperature range may be between 350° C. and 380° C. and the second temperature range is between 380° C. and 480° C. In certain other embodiments, the molten salt bath may have an overall length L with the first stage having a first length L1 that is between 10% and 50% of the overall length L. In other embodiments, the movable separator comprises a pair of spaced apart gates having a third stage located between them. The third stage may be sized and configured to receive said glass fibers with one of the pair of spaced apart gates providing thermal separation between the first stage and the third stage and the other one of the pair of spaced apart gates providing thermal separation between the second stage and the third stage. In certain other embodiments, the apparatus further comprises at least one heater disposed in and configured to heat the first stage and second stage, and a cooler disposed in and configured to cool only the first stage of the molten salt bath.

In certain embodiments, the apparatus further comprises a basket for holding glass fibers and configured to carry the glass fiber through the first stage and the second stage. The basket may include an internal open area for holding the glass fibers and a pair of opposing side walls. The opposing side walls each comprise a mesh having a plurality of openings that are sized to enable the molten salt to pass into and out of the basket while also preventing fiber from passing out of the basket. The pair of side walls may be arranged such that molten salt flows into the basket through the mesh of one of the pair of side walls, across the open area, and then out of the basket through the mesh of the other one of the pair of side walls. The plurality of openings in the mesh may form an open space that is at least 25% and no more than 65% of a total area of the mesh. In certain instances, the basket is fully enclosed and includes a selectively removable face covering an opening that is sized and configured to allow glass fibers to be placed into the internal open area of the basket. In yet further embodiments, the apparatus further comprises a rack configured to hold at least two baskets and the molten salt bath is sized and configured to allow the rack to pass through the molten salt bath while the at least two baskets are held by the rack.

In yet further embodiments, the molten salt bath may have a first end having a first depth and a second end having a second depth less than the first depth. The molten salt bath may further have a sloping bottom connecting the first end of the molten salt bath at the first depth to the second end of the molten salt bath at the second end.

Also disclosed herein is a system for recycling glass fiber waste. The system may include a kiln configured to heat the glass fiber waste to within a first temperature for a first period of time to produce glass fibers having char attached to the glass fibers. The system may also include a char separator for removing at least a portion of the attached to the glass fibers. In certain embodiments the char separator may be a thermal char separator. The system may further include a multi-stage molten salt bath providing a temperature gradient through which the glass fibers may pass. The molten salt bath may be configured to remove char from the glass fibers and to increase a tensile strength of the glass fibers by heating the glass fibers to a second temperature that is hotter than the first temperature for a second period of time in a first stage of the molten salt bath. The salt bath may then heat the glass fibers to a third temperature that is hotter than the first and second temperatures for a third period of time in a second stage of the molten salt bath. The system may further include a rinse washer configured to rinse glass fibers in a rinse solution after the glass fibers pass through the second stage of the multi-stage molten salt bath in order to remove salt attached to the glass fibers.

Also provided herein is a method for recycling glass fiber waste. The method may include providing a recycling system including a kiln, a char separator, and a multi-stage molten salt bath providing a temperature gradient. A next step may be providing glass fiber waste comprising glass fibers contained within a binder material. A next step may be converting binder material attached to the glass fibers to char by heating the glass fiber waste in the kiln to within a first temperature range for a first time period. Next, at least a portion of the char may be separated from the glass fibers with the char separator. Next, the glass fibers may be heated in a first stage of the molten salt bath to within a second and higher temperature range for a second time period to remove char from the glass fibers. In a next step the glass fibers may be heated in a second stage of the molten salt bath to within a third temperature range for a third time period in order to increase a tensile strength of the glass fibers. In certain embodiments, the first temperature range may be less than 350° C., the second temperature range may be between 350° C. and 380° C., and the third temperature range may be between 380° C. and 480° C. In those embodiments, the first time period may be between 1 and 180 minutes, the second time period may be between 0 and 180 minutes, and the third time period may be between 30 seconds and 180 minutes. As a next step, the glass fibers may be agitated to promote interaction between the glass fibers and the salt. Finally, the glass fibers may be cooled.

In certain embodiments, the recycling system may include a rinse washer and the method may further comprise rinsing the glass fibers with a rinse solution using the rinse washer to remove salt after heating the glass fibers in the second stage of the molten salt bath and then drying said glass fibers. In certain embodiments, the rinse solution comprises one or more of water, glycerol, and ammonia. In certain embodiments the method may comprise reclaiming salt captured in the rinse washer and recycling the reclaimed salt to the molten salt bath.

In certain embodiments, the method may further comprise the steps of gasifying at least a portion of the binder material to produce syngas, distilling the syngas, and recycling the syngas as a fuel for the kiln. In those embodiments, the kiln may be a closed-loop rotary kiln.

The method may also further comprise heating the glass fibers in the salt bath while the glass fibers are enclosed inside of an open area inside of a basket. The basket may include a mesh having a plurality of openings that are sized to allow molten salt to pass into the basket but to prevent glass fibers from passing out of the basket.

BRIEF DESCRIPTION OF THE DRAWINGS

Further advantages of the invention are apparent by reference to the detailed description when considered in conjunction with the figures, which are not to scale so as to more clearly show the details, wherein like reference numerals represent like elements throughout the several views, and wherein:

FIG. 6A is a perspective view of a basket rack provided with baskets according to an embodiment of the present disclosure;

FIG. 6B is a side elevation view of the basket rack shown in FIG. 6A;

FIG. 6C is a side elevation showing the basket rack in FIG. 6A after the baskets have been rotated; and FIG. 7 is a perspective view of a basket according to an alternative embodiment of the present disclosure.

DETAILED DESCRIPTION

Figure 1A:
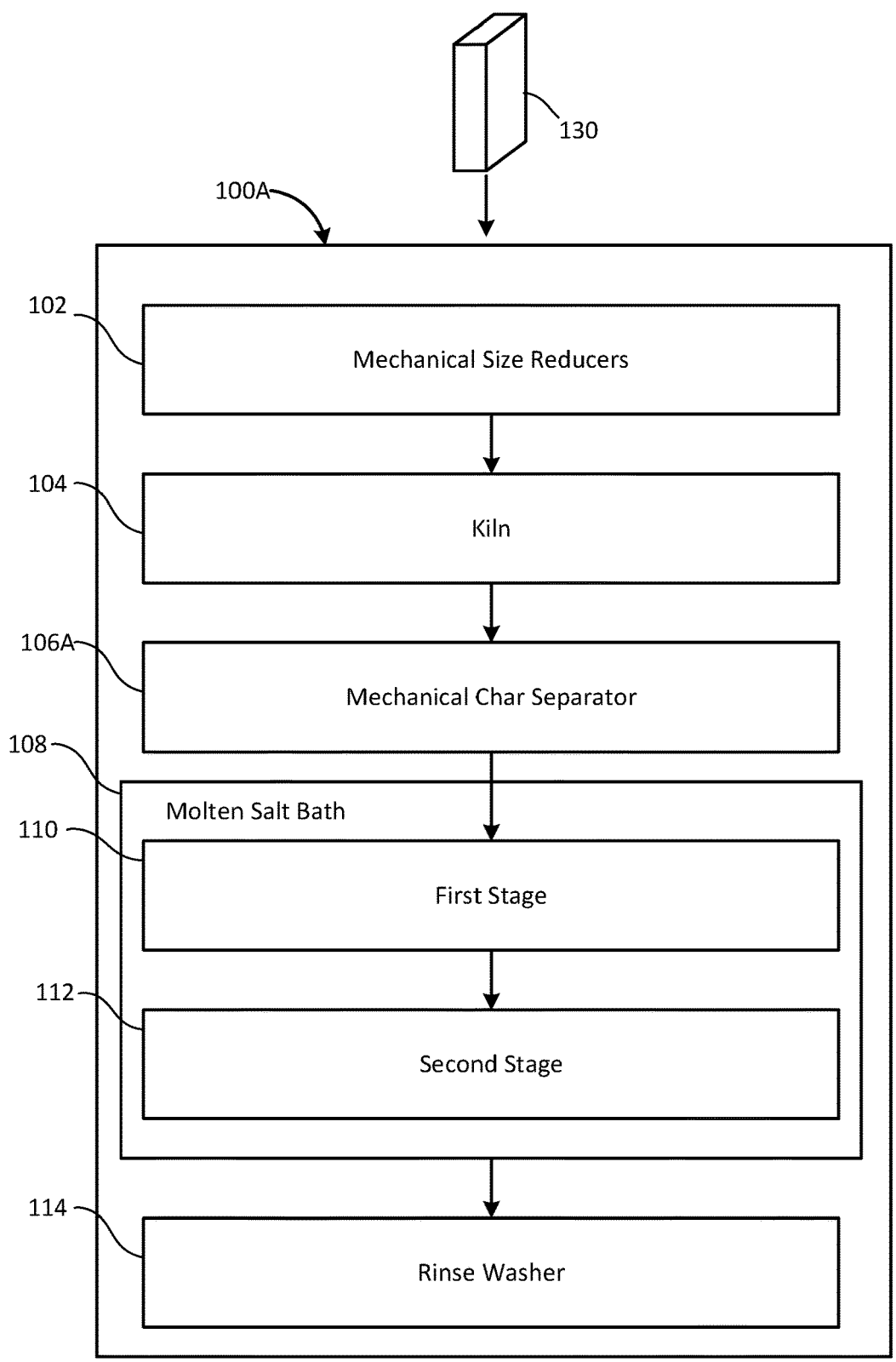
FIG. 1A is a diagrammatic representation of a method for recycling glass fiber waste according to an embodiment of the present disclosure.

Referring now to the drawings in which like reference characters designate like or corresponding characters throughout the several views, there is shown in FIG. 1A a diagrammatic view of a recycling system 100A that may be used for recycling glass fiber waste according to an embodiment of the present disclosure. The system 100A preferably includes one or more mechanical size reducers 102, a kiln 104, a mechanical char separator 106A, a multi-stage molten salt bath 108 having of a first stage 110 and a second stage 112 and providing a temperature gradient, and a rinse washer 114. In preferred embodiments, glass fibers are placed into baskets 130 that, as further discussed below, are permeable to molten salt but are impermeable to the glass fibers. Once filled with glass fibers, the baskets 130 are carried through the system 100A and the glass fibers are reconditioned. Each of these components and their function are described in further detail below.

The present disclosure provides a method for recycling glass fiber waste using recycling systems, such as system 100A. According to that method, the system 100A is provided with glass fiber waste that comprises glass fibers. Various types of glass fiber waste are contemplated, for example, glass fiber waste provided in E-glass fiber, S-glass fiber, G-glass fiber, M-glass fiber, ECR-glass fiber, etc. The glass fiber waste is preferably contained within a binder material. The binder material may be a plastic thermoset polymer matrix-type material (e.g., epoxy, polyester resin, vinyl ester resin, thermoplastic, castable acrylics, urea formaldehyde, etc.). The glass fibers may also be contained within a bitumen matrix. The glass fiber waste is preferably a scrap glass fiber material or glass fiber material at the end of its useful life. In certain preferred embodiments, the glass fiber waste is in the form of wind turbine blades. In certain embodiments, before undergoing the recycling process in the recycling system, oversized glass fiber waste is reduced in size to a size between ¼" and 10" along the axial length of the glass fiber waste via the size reducers 102. In preferred embodiments, the glass fiber waste is reduced to a size of 1.5". The size reducers 102 may include one or more saws, shredders, choppers, grinders, or other similar implements.

After being reduced to a smaller and preferably uniform size, the glass fiber waste is sent to the kiln 104, where it is exposed to a first temperature for a first period of time. In the kiln 104, the glass fiber waste is exposed to sufficiently high temperatures for a sufficiently long period of time that at least a portion of the binder material is converted to a char material (and other assorted contaminants, e.g., ash, carbon, organic material, etc.). At the same time, the first temperature is low enough to limit or, more preferably, entirely avoid burning the glass fibers. In certain preferred embodiments, the first temperature is less than 410° C., preferably between 380° C. and 395° C. and the first period of time is between 10 and 120 minutes. This process of exposing glass fibers to heat within a kiln may be carried out in batches or continuously.

In certain instances, the first temperature is sufficiently high to gasify at least a portion of the binder material. The resulting products of such gasification may be distilled or may be used as a hydrocarbon source, including for heating. In other cases, this gasification process may utilize the Fischer-Tropsch method or other methods to produce synthesis gas (i.e., syngas). In addition to syngas, other gases may also be produced by exposing the glass fibers to the heat of the kiln 104, including volatile organic compounds or "VOCs." Certain of those gases could be harmful to humans and/or the environment. As such, in certain embodiments, the exhaust gases may be passed through an exhaust scrubber before being passed to the environment. This same scrubbing method may be used to clean exhaust gases of the reconditioning process as a whole. In certain cases, the kiln 104 is a closed-loop rotary kiln such that gases produced during the heating process are not released to the atmosphere. Advantageously, a closed-loop rotary kiln allows the syngas and other gases to be captured, including for reuse or for safe disposal. For example, one potential use of the syngas is as fuel for the kiln 104 or the salt bath 108. Thus, the present method also provides for recycling certain gases produced in recycling glass fibers, including to produce other useful products. Next, within the closed-loop rotary kiln, it may be advantageous to control an atmospheric gas content and an atmospheric pressure and, specifically, to provide an atmosphere formed by an inert gas or under vacuum pressure. Providing an oxygen-free atmosphere within the kiln may also be preferred as thermal degradation of the binder material in the absence of oxygen results in a more desirable degradation and degraded binder material while avoiding combusting the binder material into carbon dioxide ($CO_2$), carbon monoxide (CO), and water ($H_2O$). Finally, by controlling the kiln environment and dwell time (i.e., the amount of time that the glass fibers remain in the kiln), the resulting products may be modified. For example, in certain cases, the char is pyrolytic but in other cases, the char is crystalline in structure.

While a portion of the char may be separated from the glass fibers by exposing the glass fibers to the heat of the kiln 104, further processing is typically required to remove more of the char (or other undesirable contaminants) from the glass fibers. As such, from the kiln 104, the glass fibers, char, and other contaminants, are preferably transferred to the separator 106A, where more of the char may be separated from the glass fibers. Other contaminants may also be separated from the glass fibers via the separator 106A. The separator 106A may be a trammel, vibrating bed, fluidized bed, or other suitable mechanism to separate the glass fibers at least partially from the char. In certain embodiments, the charred glass fibers are chemically treated in the separator 106A using a solution that may be comprised of acids and/or oxidizing agents (e.g., sulfuric acid, phosphoric acid, potassium permanganate, sodium nitrate, or potassium nitrate). In certain cases, this solution reacts with the pyrolytic portion of the char to form graphite oxide or graphene oxide. The glass fibers are preferably cleaned to remove contaminants, including graphene or graphite, by drying, straining, decanting, rinsing, etc.

Next, the cleaned and dried glass fibers are transferred to the salt bath 108. Preferably, the first stage 110 first removes the remaining char from the glass fibers. The second stage 112 then restores the tensile strength of the glass fiber, preferably through ionic exchange. In certain embodiments, the molten salt is comprised of an alkali metal nitrate. In certain embodiments, the molten salt is potassium nitrate or sodium nitrate. In other embodiments, other suitable salts are used.

In the first stage 110, the glass fibers are placed into a molten salt having a temperature range T1 that is preferably between 350° C. and 380° C. Preferably, the temperature of the first stage 110 of the salt bath 108 is approximately 350° C. If the temperature in the first stage 110 is too high (e.g., over 350° C. in some cases) an undesirable and potentially violent exothermic reaction (i.e., a reaction wherein energy is released in the form of heat) may occur. Such an exothermic reaction can create very high heat that disintegrates the glass fibers or degrades the glass fibers beyond a usable or recoverable state. As the glass fibers are in contact with the molten salt in the first stage 110, the fibers are agitated to promote interaction between the molten salt and the glass fibers. Agitation may be a result of simply moving the glass fibers through the molten salt or, if the glass fibers are stationary, passing the molten salt over and through the glass fibers, including by cross flow such as by using pumps or by gravity. Agitation may also occur by bubbling a gas, such as an inert gas, through the salt bath 108. In certain embodiments, exposing the glass fibers to the molten salt in the first stage 110 for a first time period between 0 and 180 minutes helps ensure substantially all remaining char attached to the glass fibers is removed and remains in the salt bath when the glass fibers are removed. However, preferably, glass fibers are in the first stage 110 for less than 30 minutes.

Next, the glass fibers are moved to the second stage 112, and preferably are not allowed to cool down between the first stage 110 and the second stage 112. Accordingly, glass fibers are preferably transferred from the first stage 110 to the second stage 112 while continuously located in (and heated by) the salt bath 108. In the second stage 112, the glass fibers are placed into a molten salt having a temperature range T2 that is preferably between 380° C. and 480° C. In certain embodiments, the second stage 112 is heated to 400° C. or more. In certain embodiments, the second stage 112 is heated to 410° C. or more. In certain embodiments, the glass fibers remain in the second stage 112 for a second time period between 30 seconds and 180 minutes. Preferably, glass fibers are in the second stage 112 for less than 30 minutes. Heating the glass fibers in a cooler first stage 110 and then in a hotter second stage 112 assists in preventing the glass fibers from adversely reacting when exposed to the hotter second stage. Exposing the glass fibers to the higher temperatures of the second stage 112 (e.g., at or above 400° C.) for the second time period facilitates an ionic exchange between the salts and the surface of the glass fibers. Although the resultant strengthening may vary based on the temperature and time exposure, some degree of strengthening is critical to the usability of the recycled glass fibers. However, preferably, glass fibers remain in the second stage 112 until they are restored to be roughly equivalent to unused, i.e., virgin, glass fibers. Preferably, glass fibers in the second stage 112 are agitated within the molten salt to promote interaction between the molten salt and the glass fibers. This agitation may be the result of moving the glass fibers through and within the molten salt or moving the molten salt over and through the glass fibers.

After being reconditioned by the salt bath 108, the glass fibers are preferably transferred to the rinse washer 114, where they are washed with a rinse solution (e.g., water) to remove residual salt that remains on the glass fibers. In addition, the rinse washer 114 helps to cool the glass fibers. In certain embodiments, the rinse washer 114 is a tunnel washer, a continuous batch washer, or a continuous batch tunnel washer. The rinse solution is typically water, glycerol, ammonia, surfactants, or a combination thereof. However, other types of rinse solution may be appropriate. In certain instances, the rinse solution contains finishing or sizing agents, such as alkoxysilane, titanates, zirconates, or other suitable finishing or sizing agents, including organic sizing agents.

In certain preferred embodiments, the salt captured within the rinse solution, which is often very valuable, is reclaimed for further use. One preferable method for recovering the salt is to alter the concentration of the rinse solution, such as by cooling the rinse solution rapidly to cause the salt contained within to precipitate and separate from the liquid rinse solution. Suitable methods for cooling the rinse solution include utilizing a heat exchanger that may be connected to a chilled water supply, glycol supply, heat transfer oil, etc. Cooling may also be accomplished via a refrigerator or atmospheric air. In other preferred embodiments, the rinse solution is heated and evaporated, leaving the salt for further reuse. The evaporated rinse solution may then be condensed and recaptured in a reservoir for further use. Methods for evaporation include using a solar still or rapidly heating the rinse solution using conventional heaters (e.g., steam heater, natural gas heater, electric heater, heat pump), residual process heat, or a heater fueled by syngas produced from the kiln 104. Other methods for altering the concentration of the rinse solution are via a wiped film evaporator or redirecting residual process heat to evaporate the solvent of the rinse solution.

Additional processing of the glass fibers may provide further advantages. For example, in certain cases, the glass fibers (and, optionally, the rinse solution) are exposed to microwaves, which exfoliates any graphite/graphene oxide present on the glass fibers and dries the glass fibers. In certain cases, the glass fiber is further treated with an amine and/or a silane (e.g., (3-Aminopropyl)triethoxysilane or APTES) to produce a silane-functionalized graphene material that resides on the surface of the glass fibers. These silane-functionalized graphene materials may be used to make the material compatible with resins and/or polymers. In certain cases, silane-functionalized graphene materials may be used to produce nonwoven mats that are suitable for use in a resin lay-up process. In other cases, the silane-functionalized graphene materials are compounded into plastic pellets, such as via extrusion, which may then be sold as an intermediate material. In certain cases, additional nanomaterials that are not produced during the charring process or from the char may be used to coat the surface of the glass fibers in order to provide still further desirable properties.

Figure 1B:
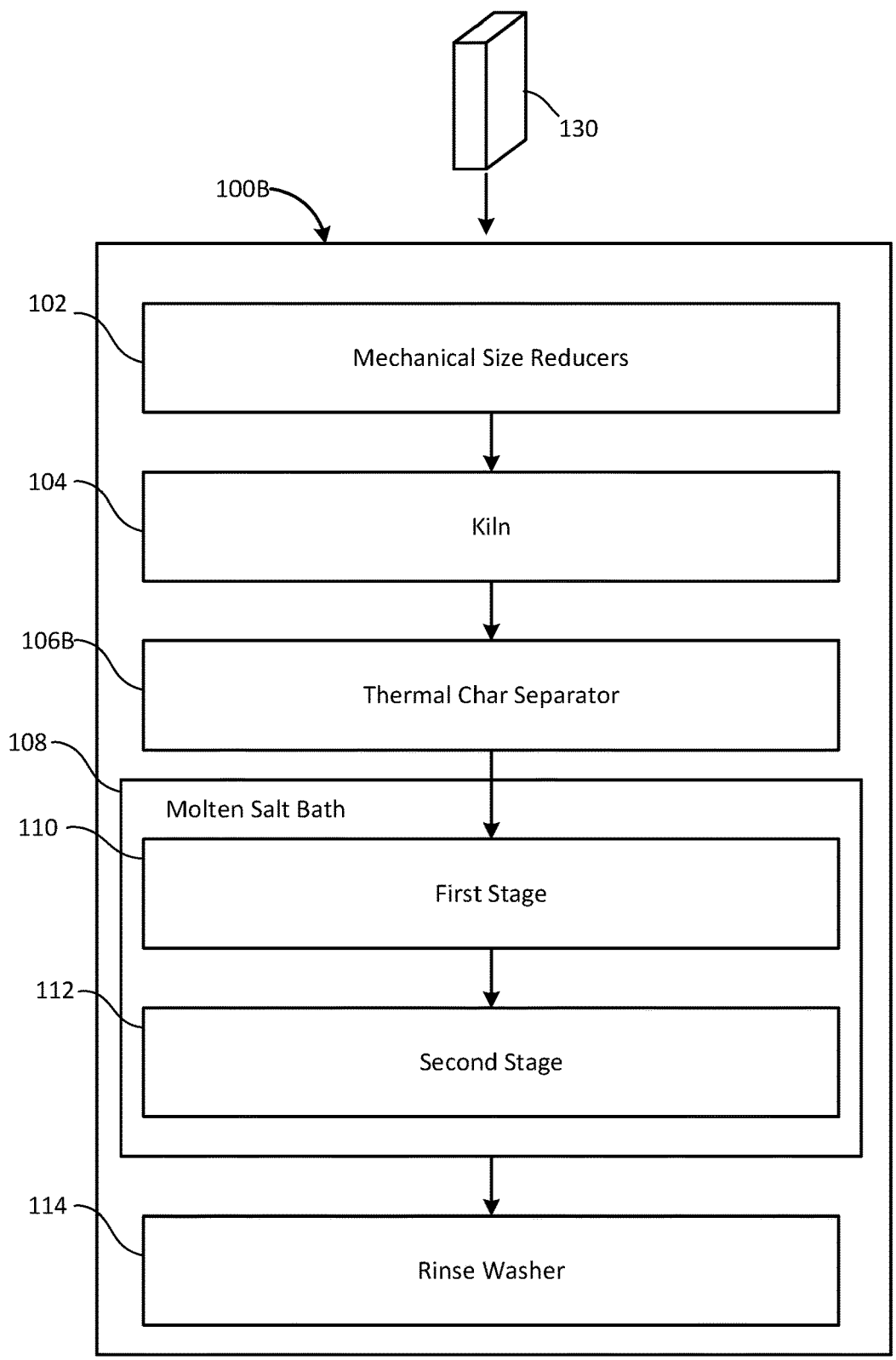
FIG. 1B is a diagrammatic representation of a method for recycling glass fiber waste according to an alternative embodiment of the present disclosure.

In certain alternative embodiments, such as those depicted in FIG. 1B, the system 100B includes a includes one or more mechanical size reducers 102, a kiln 104, a thermal char separator 106B, a multi-stage molten salt bath 108 having of a first stage 110 and a second stage 112 and providing a temperature gradient, and a rinse washer 114. The system 100B operates much the same as system 100A, however the mechanical char separator 106A of the system 100A is replaced with a thermal char separator 106B. In certain embodiments, the thermal char separator 106B may be a burn off oven or a similar, suitable device. The thermal char separator 106B operates at temperature sufficiently high to remove char attached to the glass fibers after exiting the kiln 104. However, these temperatures are low enough to avoid thermal degradation of the glass fibers. Utilizing the thermal char separator 106B allows for a more complete removal of char from the glass fibers when compared to the mechanical char separator 106A. Additionally, the more complete removal of char via the thermal char separator 106B allows for alterations in the molten salt bath 108. Specifically, the glass fibers need only dwell in the first stage 110 for a minimal time, if any. The glass fibers are then moved to the second stage 112 or placed directly into the second stage. Because the thermal char separator 106B removes substantially all of the char, there is no risk of an exothermic reaction when placing the glass fibers directly into the high heat of the second stage 112. Accordingly, in certain embodiments, the glass fibers are placed directly into the second stage 112 and avoid the first stage. In these embodiments, the molten salt bath 108 only includes a second stage 112. Utilizing the thermal char separator 106B, the total combined time in the first stage 110 and the second stage 112, or only the second stage, is as low as 30 seconds. This time period allows for adequate ionic exchange between the salts and the glass fibers, resulting in reconditioned glass fibers. Further, the thermal char separator 106B minimizes or, in some instances, eliminates the need for reclamation of salt from the rinse solution within the rinse washer 114 because a negligible amount of char and contaminants interacts with the salt and is therefore present in the rinse solution.

Figure 2:
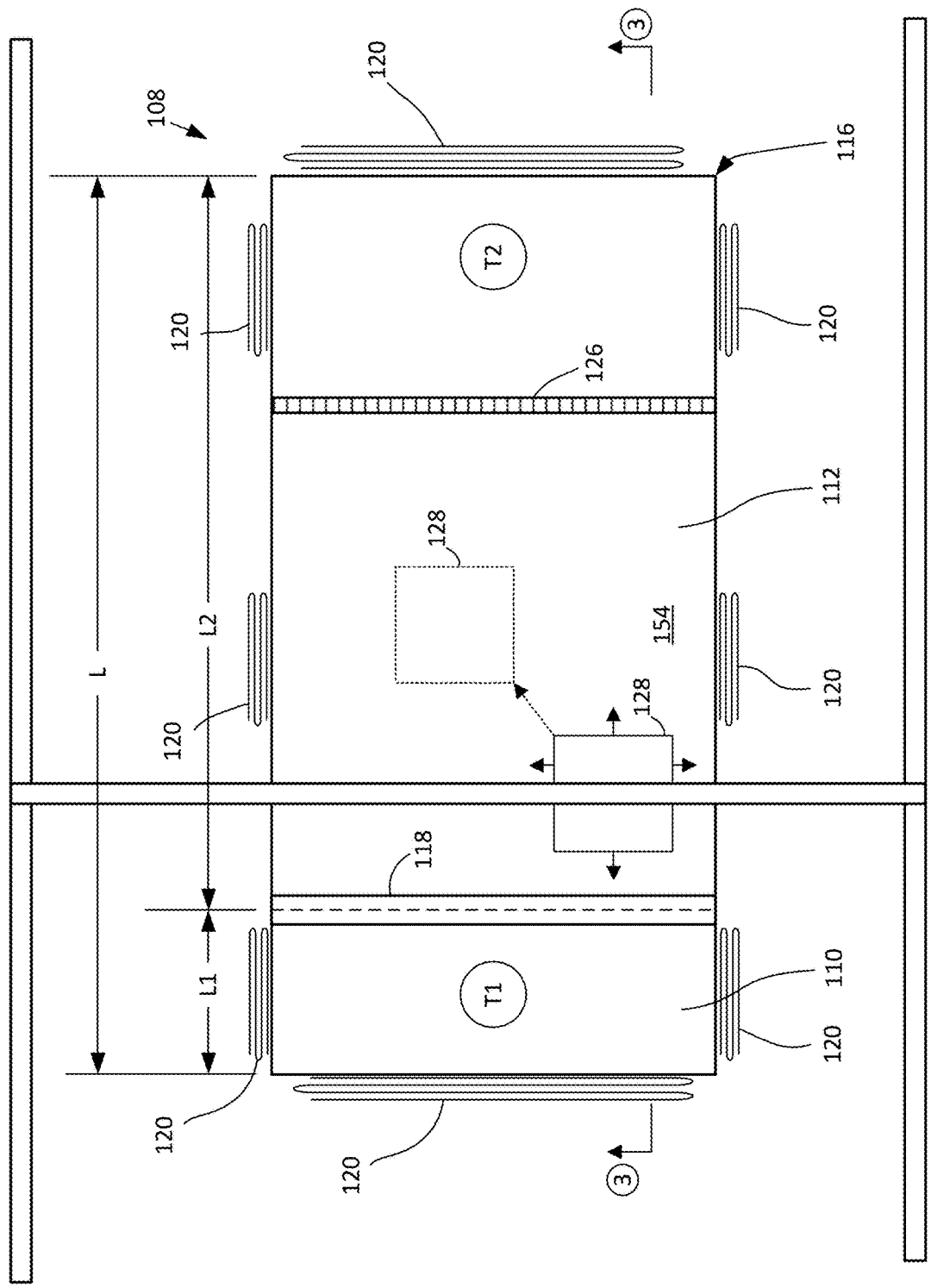
FIG. 2 is a top plan view of a molten salt bath of a system for recycling glass fiber waste according to an embodiment of the present disclosure.
Figure 3:
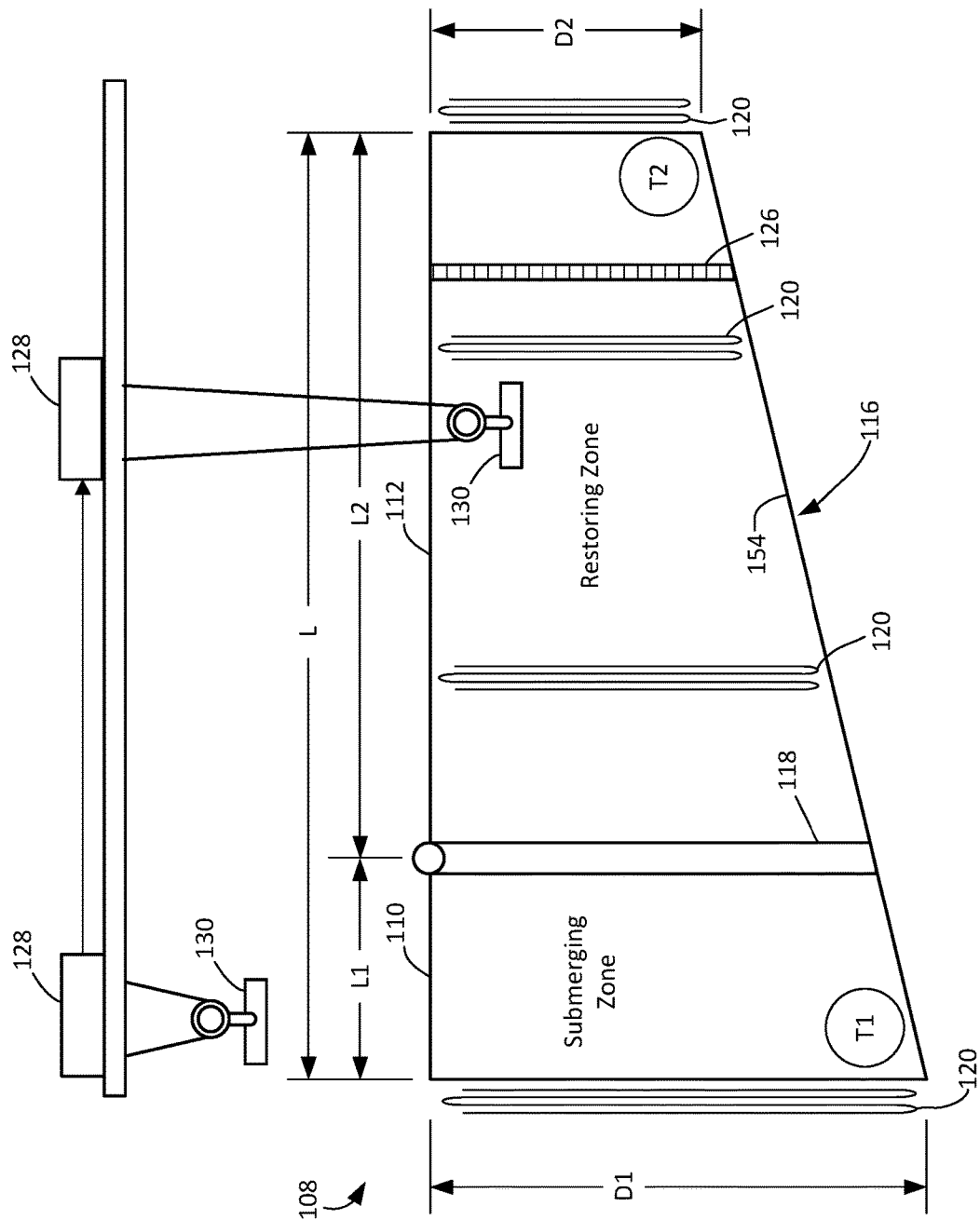
FIG. 3 is a side elevation view of the salt bath of FIG. 2, shown along line "3-3"

With reference now to FIGS. 2 and 3, the salt bath 108 may include one or more stages or holding areas (e.g., tanks, vats, reactor chamber, flotation cell), preferably disposed on a single chassis 116, including the first stage 110 (i.e., a Submerging Zone) and the second stage 112 (i.e., a Restoring Zone). The salt bath 108 has an overall length L, with the first stage 110 preferably having a first length L1 and the second stage having a second length L2. In certain embodiments, the overall length L is between 2 meters and 20 meters with the first length L1 comprising 10%-50% of the overall length.

Next, the salt bath 108 preferably has a non-uniform depth. A first end of the salt bath 108, located at the first stage 110, provides a first depth D1 and an opposing end of the salt bath, located at the second stage 112, provides a preferably shallower second depth D2. In certain embodiments, first depth D1 and second depth D2 each range from 0.5 meters to 5 meters, with the first depth D1 being greater than the second depth D2. In certain embodiments, a sloping bottom 154 connects the first end of the molten salt bath at the first depth D1 to the second end of the molten salt bath at the second depth D2. This height difference assists in the formation of the desirable temperature gradient throughout the entire length L of the salt bath 108.

The first stage 110 and the second stage 112 (or portions within one of the stages) may be separated by one or more gates 118, which each create a thermal barrier between the two divided portions of the salt bath 108 and assist in minimizing unwanted heat transfer and contaminant transfer between the stages. In certain embodiments, the gates 118 swing or slide upwards in a single motion when necessary to create a doorway to allow the glass fibers to travel along the length of the salt bath 108. Then, the gates 118 swing down in a single motion once the glass fiber has moved past the gate to re-establish a thermal barrier within the salt bath 108. In the illustrated embodiment, a single swing-out gate 118 is provided. However, in other embodiments, more than one gate 118 may be used. Also, other mechanisms may be provided in place of the illustrated gate 118. For example, gate 118 may be replaced with movable or fixed baffles 126, which may be perforated or, more preferably, solid to limit heat and contaminant transfer between or within each of the stages 110, 112. Advantageously, the presence of the gate(s) 118 and baffles 126, combined with the non-uniform depth of the salt bath 108, lowers the energy requirement for heating the molten salt to the required temperatures and assists in maintaining the desired temperature gradient as well.

Additionally, one or more heat transfer elements 120 (e.g., heater, heat exchanger, chiller, or the like) can be provided at intervals along the length L and inside or outside of the salt bath 108 to heat and/or cool the molten salt as needed or desired. Ideally, elements 120 assist in maintaining temperatures within the salt bath 108 in a gradually hotter gradient along length L such that the coolest temperatures are located at the Submerging Zone (i.e., first stage 110), where the glass fibers are placed into the salt bath, and the hottest temperatures are located at the Restoring Zone (i.e., the second stage 112), where the glass fibers are removed from the salt bath.

When the salt bath 108 is in use, glass fibers and any remaining char are submerged at the first stage 110, preferably in a basket 130 via overhead conveyor 128. As noted above, preferably, the salt bath 108 removes the remaining char from the glass fibers. The glass fibers are then moved, while submerged in the salt bath, to the second stage 112. By providing a single salt bath 108, separated into the first stage 110 and the second stage 112 on a single chassis 116, the glass fibers are more easily passed between the stages without removing the glass fibers from the salt bath and without cooling the glass fibers, which increases the efficiency of both the salt bath 108 and the reconditioning of the glass fibers.

Figure 4:
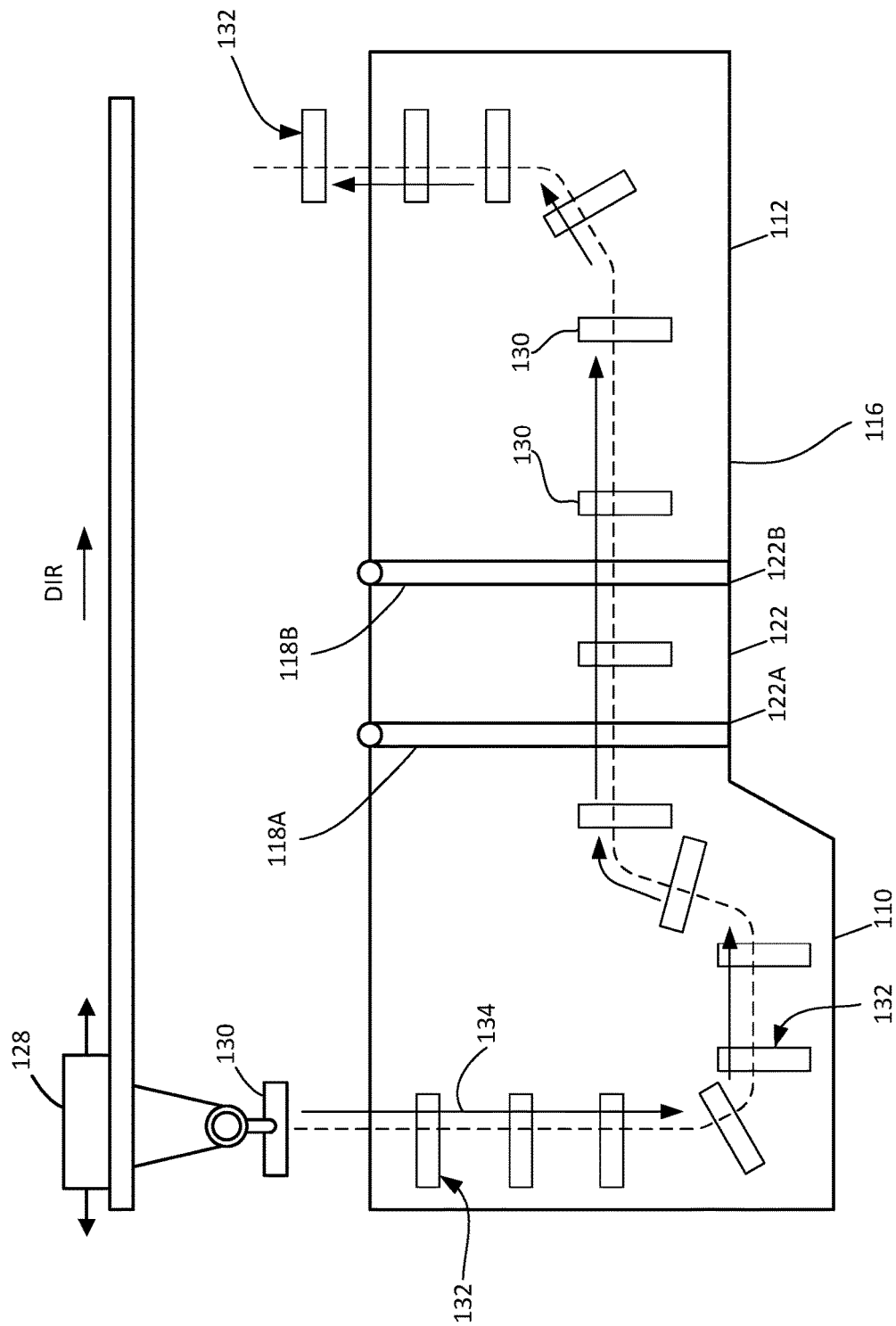
FIG. 4 is a side elevation view of a salt bath according to an embodiment of the present disclosure.

Now with reference to FIG. 4, a salt bath 108 having a different configuration is shown. In this embodiment, the salt bath 108 includes the first stage 110 and second stage 112, as discussed above, but also includes a transition zone 122 that is located between the first and second stages. In certain embodiments, more than one transition zone is provided. For example, in certain embodiments, a pair of transition zones is provided between the first stage 110 and second stage 112. Each transition zone is preferably thermally separated from the adjacent sections. For example, in the illustrated embodiment, gates 118A and 118B are provided at the leading edge 122A and trailing edge 122B, respectively, of transition zone 122. In certain embodiments, only one of the gates 118A, 118B adjacent transition zone 122 are opened at a time. Once the gate is opened, the glass fibers are moved through the open gate and then the gate is preferably closed behind the glass fibers before any subsequent gates are opened. Providing the gates 118, 118A, 118B, generally, and only opening one gate at a time assists in blocking convection currents and maintaining the desired temperature gradient within the salt bath 108.

In operation, glass fibers and any remaining char are removed from the separator 106A and placed into one or more baskets 130. In preferred embodiments, the baskets 130 are attached to an overhead crane or conveyor 128, which can move the baskets in a longitudinal, vertical, or transverse direction. Preferably, conveyor 128 is capable of rotating baskets in any direction to place the baskets into a suitable orientation with respect to the salt bath 108. Accordingly, this movement allows the baskets 130 to be selectively placed or moved into any location or orientation within the salt bath 108. Preferably, the baskets 130 are moved into the first stage 110, where the remaining char is removed from the glass fibers. The motion of the basket 130 through the salt bath 108 agitates the glass fibers and promotes full contact between the glass fibers and the molten salt. The basket 130 then passes through the first gate 118A and into the transition zone 122. Use of the transition zone 122 allow the glass fibers and basket 130 to stay heated while moving between the stages. The transition zone 122 also allows a clearer division between the first stage 110 and the second stage 112 while preventing excess energy from passing between the stages. The transition zone 122 also prevents or minimizes any detached char or contaminants captured in the first stage 110 from passing into the second stage 112. After the basket 130 has entered the transition zone 122 and the first gate 118A has closed, the second gate 118B opens as the basket passes into the second stage 112 where the glass fibers are reconditioned at the higher temperatures of the second stage.

Figure 5:
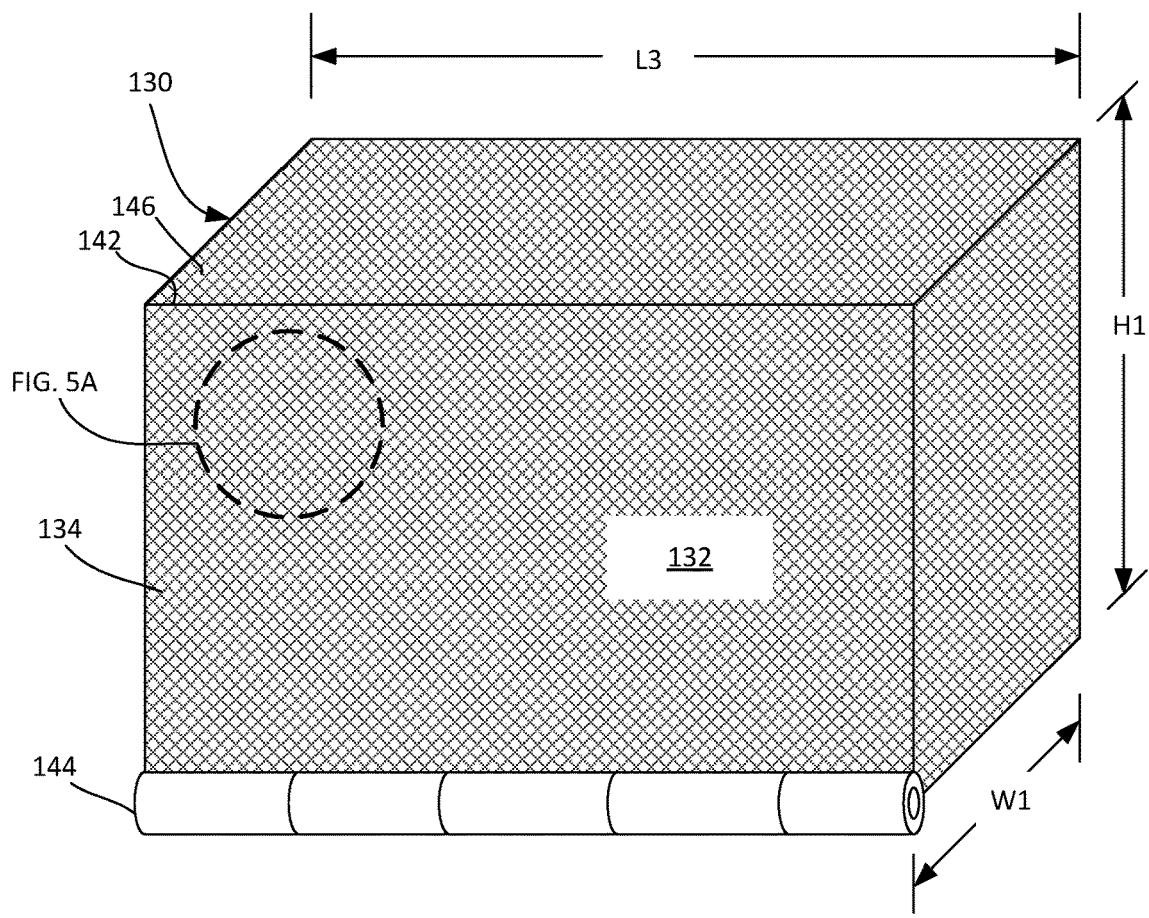
FIG. 5 is a perspective view of a basket according to an embodiment of the present disclosure.
Figure 5A:
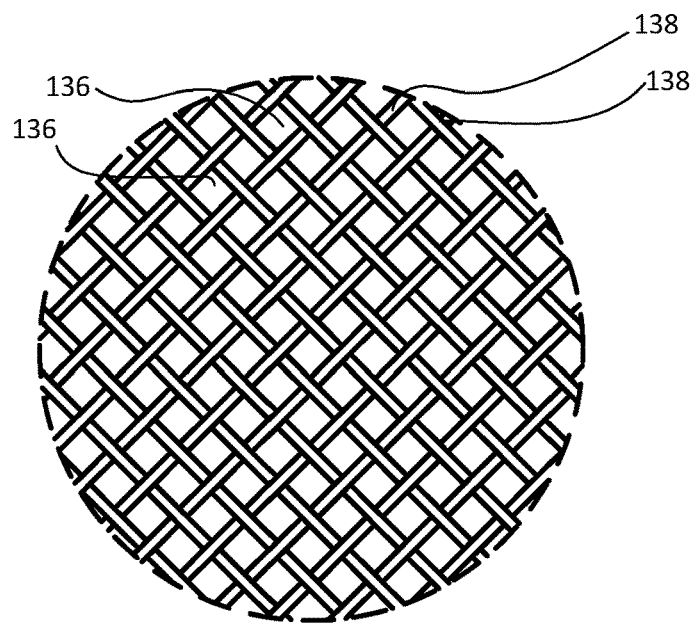
FIG. 5A is a detail view of a portion of the basket shown in FIG. 5 and enclosed within a circle identified by "FIG. 5A"

With continued reference to FIG. 4 and now FIG. 5 and FIG. 5A, the basket 130, in certain embodiments, is generally cuboid shaped, includes a front face 132, and is defined by length L3, width W1 and height H1. While, in preferred embodiments, length L3 and height H1 can be any dimensions, width W1 is preferably no greater than 4". Limiting the width of the basket 130 in this way assists in preventing glass fibers from burning in the salt bath 108 while also ensuring adequate interaction between the molten salt and the glass fibers. More preferably, width W1 is between 3.5" and 4". Preferably, the basket 130 is constructed entirely from a mesh 134 having a plurality of openings 136, allowing the molten salt to pass through the basket and fully and completely interact with the glass fibers contained within. Critically, the metallic mesh 134 must have openings 136 large enough to allow molten salt to pass through the basket 130 but not so large as to allow glass fibers to escape the basket through the openings. In addition, the ratio of the area of the openings 136 compared to the total area of the metallic mesh 134 expressed as a percentage (i.e., the porosity), may be optimized to allow for adequate flow of salt through the basket 130 as well as proper heat transfer from the salt to the glass fibers. For example, too low of a porosity can result in crystallization of salt on the strands 138 forming the mesh, preventing adequate flow of molten salt through the basket 130. Conversely, if the porosity is too high, the glass fibers can escape through the metallic mesh 134. Additionally, a high porosity basket 130 may heat too quickly in the molten salt, resulting in destruction of the glass fibers contained within. In certain preferred embodiments, the largest dimension of any one opening 136 is between 0.01" and 0.1" and the porosity is between 25% and 65%. In more preferred embodiments, the largest dimension of any one opening 136 is approximately 0.027" and the porosity is approximately 29%.

When each basket is submerged into the salt bath 108, the front face 132 is preferably submerged first. In other words, the molten salt passes through the front face 132 and flows along the width W1 as the basket travels along the conveyor 128. The basket 130 is then preferably rotated as it travels along the conveyor 128, causing the molten salt to flow along length L3 or along width W1 but from back to front. This motion is shown best in FIG. 4.

In certain embodiments, the front face 132 is detachable from the basket 130 to allow for easy loading of the glass fibers into the basket. In other embodiments, the front face 132 of the basket 130 is hinged, preferably along either a top edge 142 or a bottom edge 144. In yet further embodiments, the top 146 is open to allow fibers to be loaded into and unloaded from the basket 130. Alternatively, the top 146 may be removable or hinged to allow for loading and unloading of the glass fibers. Making other faces (i.e., side, back, bottom) removable is also contemplated.

As shown in FIGS. 6A-6C, alternative arrangements for various baskets are contemplated. For example, an array of baskets 130 may be placed within a larger rack 148, the rack may then be attached to the conveyor 128 and moved through the salt bath 108 in the manner discussed above. In certain instances, it may be desirable to arrange the baskets 130 with each of their respective front faces 132 oriented perpendicularly to the flow direction DIR (shown in FIG. 4). In other instances, the baskets 130 may be positioned such that each of the front faces 132 is oriented at an angle θ when compared to the flow direction 140, as shown in FIG. 6C. Preferably, angle θ is between 0° and 180°.

Finally, as shown in FIG. 7, non-rectangular baskets, such as circular basket 150, are also contemplated. Circular basket 150 has a circular cross section with a diameter D. When the basket 150 is in use, the single mesh face 152 is preferably oriented perpendicular to flow direction DIR. In certain embodiments, like width W1 of basket 130, discussed above, diameter D should be less than 4" and is preferably between 3.5" and 4". Circular basket 150 is also preferably constructed from a metallic mesh. In certain embodiments, circular basket 150 includes an open top 156 for loading/unloading of the glass fibers. Alternatively, a removable top panel is provided and covers open top 156.

Although this description contains many specifics, these should not be construed as limiting the scope of the invention but as merely providing illustrations of some of the presently preferred embodiments thereof, as well as the best mode contemplated by the inventor of carrying out the invention. The invention, as described herein, is susceptible to various modifications and adaptations as would be appreciated by those having ordinary skill in the art to which the invention relates.

What is claimed is:

1. An apparatus for removing char from glass fibers and for increasing a tensile strength of the glass fibers, the apparatus comprising:
    a molten salt bath provided with molten salt configured to remove char from the glass fibers and to increase a tensile strength of the glass fibers by forming a temperature gradient for gradually and continuously heating the glass fibers, the molten salt bath having:
        a first stage configured to heat glass fibers to within a second temperature range;
        a second stage configured to heat glass fibers to within a third temperature range such that a temperature gradient is formed in the molten salt bath;
        a movable separator provided between the first stage and the second stage and configured to provide thermal separation between the first stage and the second stage of the molten salt bath, wherein the separator is moveable to allow the glass fibers to pass from the first stage into the second stage while still being located within the molten salt bath and remaining continuously heated to at least within the second temperature range; and
    transport means for transporting the glass fibers through the molten salt bath, including from the first stage, past the movable separator, and to the second stage.

2. The apparatus of claim 1 wherein the second temperature range is between 350° C. and 380° C., the third temperature range is between 380° C. and 480° C.

3. The apparatus of claim 1 further comprising a basket for holding glass fibers and configured to carry the glass fibers through the first stage and the second stage, wherein the basket includes an internal open area for holding the glass fibers and also including a pair of opposing side walls that each comprise a mesh having a plurality of openings that are sized to enable the molten salt to pass into and out of the basket while also preventing fiber from passing out of the basket, wherein the side walls are arranged such that molten salt flows into the basket through the mesh of one of the pair of side walls, across the open area, and then out of the basket through the mesh of the other one of the pair of side walls.

4. The apparatus of claim 3 wherein the plurality of openings in the mesh forms an open space that is at least 25% and no more than 65% of a total area of the mesh.

5. The apparatus of claim 3 wherein the basket is fully enclosed and includes a selectively removable face covering an opening that is sized and configured to allow glass fibers to be placed into the internal open area of the basket.

6. The apparatus of claim 3 further comprising a rack configured to hold at least two baskets, wherein the molten salt bath is sized and configured to allow the rack to pass through the molten salt bath while the at least two baskets are held by the rack.

7. The apparatus of claim 1 wherein the molten salt bath has an overall length L and wherein the first stage has a first length L1 that is between 10% and 50% of the overall length L.

8. The apparatus of claim 1 wherein the movable separator comprises a pair of spaced apart gates having a third stage located between them that is sized and configured to receive said glass fibers, wherein one of the pair of spaced apart gates is configured to provide thermal separation between the first stage and the third stage and the other one of the pair of spaced apart gates is configured to provide thermal separation between the second stage and the third stage.

9. The apparatus of claim 1 wherein the molten salt bath has a first end having a first depth and a second end having a second depth that is less than the first depth.

10. The apparatus of claim 9 further comprising a sloping bottom connecting the first end of the molten salt bath at the first depth to the second end of the molten salt bath at the second depth.

11. The apparatus of claim 1 further comprising at least one heater disposed in and configured to heat the first stage and second stage, and a cooler disposed in and configured to cool only the first stage of the molten salt bath.

12. The apparatus of claim 1 further comprising:
a kiln configured to heat the glass fibers to within a first temperature range to produce glass fibers having char attached to the glass fibers; and
a rinse washer configured to rinse glass fibers in a solution after the glass fibers pass through the second stage of the multi-stage molten salt bath in order to remove salt attached to the glass fibers.

13. An apparatus for removing char from glass fibers and for increasing a tensile strength of the glass fibers, the apparatus comprising:
a molten salt bath provided with molten salt configured to remove char from the glass fibers and to increase a tensile strength of the glass fibers by forming a temperature gradient for gradually and continuously heating the glass fibers, the molten salt bath having:
a first stage configured to heat glass fibers to within a second temperature range;
a second stage configured to heat glass fibers to within a third temperature range such that a temperature gradient is formed in the molten salt bath;
a movable separator provided between the first stage and the second stage and configured to provide thermal separation between the first stage and the second stage of the molten salt bath, wherein the separator is moveable to allow the glass fibers to pass from the first stage into the second stage while still being located within the molten salt bath and remaining continuously heated to at least within the second temperature range.

14. The apparatus of claim 13 further comprising:
a kiln configured to heat the glass fibers to within a first temperature range to produce glass fibers having char attached to the glass fibers; and
a rinse washer configured to rinse glass fibers in a solution after the glass fibers pass through the second stage of the multi-stage molten salt bath in order to remove salt attached to the glass fibers.

15. The apparatus of claim 13 wherein the movable separator comprises a pair of spaced apart gates having a third stage located between them that is sized and configured to receive said glass fibers, wherein one of the pair of spaced apart gates is configured to provide thermal separation between the first stage and the third stage and the other one of the pair of spaced apart gates is configured to provide thermal separation between the second stage and the third stage.

16. The apparatus of claim 13 wherein the molten salt bath has a first end having a first depth and a second end having a second depth that is less than the first depth.

17. The apparatus of claim 13 further comprising at least one heater disposed in and configured to heat the first stage and second stage, and a cooler disposed in and configured to cool only the first stage of the molten salt bath.

18. The apparatus of claim 13 further comprising a basket for holding glass fibers and configured to carry the glass fibers through the first stage and the second stage, wherein the basket includes an internal open area for holding the glass fibers and also including a pair of opposing side walls that each comprise a mesh having a plurality of openings that are sized to enable the molten salt to pass into and out of the basket while also preventing fiber from passing out of the basket, wherein the side walls are arranged such that molten salt flows into the basket through the mesh of one of the pair of side walls, across the open area, and then out of the basket through the mesh of the other one of the pair of side walls.

19. The apparatus of claim 18 wherein basket is fully enclosed and includes a selectively removable face covering an opening that is sized and configured to allow glass fibers to be placed into the internal open area of the basket.

20. The apparatus of claim 18 further comprising a rack configured to hold at least two baskets, wherein the molten salt bath is sized and configured to allow the rack to pass through the molten salt bath while the at least two baskets are held by the rack.

* * * * *